United States Patent
Gupta

(10) Patent No.: US 6,339,614 B1
(45) Date of Patent: *Jan. 15, 2002

(54) METHOD AND APPARATUS FOR QUANTIZING AND RUN LENGTH ENCODING TRANSFORM COEFFICIENTS IN A VIDEO CODER

(75) Inventor: Atul Gupta, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,219

(22) Filed: Dec. 20, 1996

(51) Int. Cl.[7] .............................. H04N 7/12; H04N 1/66
(52) U.S. Cl. ................................. 375/240.01
(58) Field of Search ................ 348/405.1, 406.1, 348/414.1, 417.1, 418.1, 422.1, 425, 398.1, 412.1, 413.1, 420.1; 358/432, 133, 479; 341/63; 364/715.62; 382/232, 264, 234, 239, 251; 386/33; 708/402, 403, 400; 375/240.01, 240.15, 240.16; H04N 7/12; H04B 1/66

(56) References Cited

U.S. PATENT DOCUMENTS

| | | | | |
|---|---|---|---|---|
| 5,021,891 A | * | 6/1991 | Lee ............................. 358/432 |
| 5,087,913 A | * | 2/1992 | Eastman ...................... 341/95 |
| 5,146,221 A | * | 9/1992 | Whiting et al. ............... 341/67 |
| 5,253,055 A | * | 10/1993 | Civanlar et al. ............ 358/133 |
| 5,295,077 A | * | 3/1994 | Fukuoka ...................... 358/479 |
| 5,337,087 A | * | 8/1994 | Mishima ..................... 348/405 |
| 5,347,310 A | * | 9/1994 | Yamada et al. ............. 348/405 |
| 5,369,502 A | * | 11/1994 | Fukudat et al. ............. 382/234 |
| 5,434,684 A | * | 7/1995 | Sugiyama .................... 382/251 |
| 5,450,599 A | * | 9/1995 | Horvath et al. ............. 395/800 |
| 5,506,580 A | * | 4/1996 | Whiting et al. ............... 341/51 |
| 5,543,844 A | * | 8/1996 | Mita et al. .................. 348/405 |
| 5,553,164 A | * | 9/1996 | Itagaki ....................... 382/232 |
| 5,559,557 A | * | 9/1996 | Kato .......................... 348/405 |
| 5,606,421 A | * | 2/1997 | Suzuki et al. ................. 386/33 |
| 5,706,216 A | * | 1/1998 | Reisch .................. 364/715.62 |
| 5,724,097 A | * | 3/1998 | Hibi et al. .................. 348/405 |
| 5,724,453 A | * | 3/1998 | Ratnakar et al. ............ 382/251 |
| 5,732,157 A | * | 3/1998 | Osawa ........................ 382/244 |
| 5,734,439 A | * | 3/1998 | Mishima et al. ............ 348/398 |
| 5,751,232 A | * | 5/1998 | Inoue et al. .................. 341/63 |
| 5,786,780 A | * | 7/1998 | Park et al. .................... 341/67 |
| 5,798,718 A | * | 8/1998 | Hadady ........................ 341/51 |
| 5,861,922 A | * | 1/1999 | Murashita et al. .......... 348/420 |
| 5,875,266 A | * | 2/1999 | Fukuda et al. .............. 382/251 |
| 5,905,813 A | * | 5/1999 | Terane ......................... 382/239 |
| 5,933,533 A | * | 8/1999 | Fukuda et al. .............. 382/234 |
| 5,933,538 A | * | 8/1999 | Fukuda et al. .............. 382/251 |
| 5,832,128 A | * | 11/1999 | Suzuki ........................ 382/264 |
| 5,982,437 A | * | 11/1999 | Ojazaki et al. ............. 348/413 |
| 6,055,273 A | * | 4/2000 | Isomura ....................... 375/240 |

\* cited by examiner

Primary Examiner—Chris Kelley
Assistant Examiner—Tung Vo
(74) Attorney, Agent, or Firm—Kenyon & Kenyon

(57) ABSTRACT

A method and apparatus for run length encoding video data for transform based coders. The video data is separated into blocks of pixels. The pixel values are transformed to another set of values which can be represented with less data. The transformed values are quantized by generating a quantized magnitude and sign for multiple transformed values at a time, while removing branch misprediction errors during the quanitizing process. The quantized values are run length encoded by removing branch misprediction errors during the encoding process.

21 Claims, 6 Drawing Sheets

METHOD AND APPARATUS FOR QUANTIZING AND RUN LENGTH ENCODING TRANSFORM COEFFICIENTS IN A VIDEO CODER

BACKGROUND OF THE INVENTION

The invention relates to the compression of video signals. More particularly, the invention relates to a method and apparatus for quantizing and run length encoding transform coefficients in a video coder.

A number of transform-based video coders utilize a quantization algorithm and a run length encoding algorithm to compress a video signal. In general, quantization refers to reducing the magnitude of transform coefficients, and increasing the number of zero valued transform coefficients. Run length encoding is a technique wherein a series of repetitive data symbols are compressed into a shorter code which indicates the length of a code and the data being repeated.

The purpose of a video coder is to reduce the data required to represent the video signal while maintaining an acceptable viewing quality. Thus, there exists a need in the art for efficient compression techniques to further this purpose. One method of increasing the efficiency of a compression technique is to reduce the number of processing cycles required to implement the technique.

Quantization and run length encoding are two of the more expensive steps in a video coder in terms of the number of processing cycles required to implement these techniques. Increased coding efficiency during these steps of a compression algorithm would free processing cycles the video coder could use to improve video compression. For example, a video coder could use the extra processing cycles to increase the number of encoded frames which would increase the viewing quality of the decompressed video signal, or perform better motion estimation in block motion compensated transform based video coders.

One reason conventional run length encoding and quantization techniques are expensive is that they are susceptible to branch misprediction errors. For example, run length encoding techniques for block motion compensated transform based video coders reduce a serial bit stream to a sequence of a triple of values. Each triple of values comprises a run value representing the number of consecutive values of zero, a coefficient value representing a non-zero value, and a sign for the non-zero coefficient value. Such a run length algorithm could be implemented using the following pseudo-code:

Initialize run length to zero
    Traverse coefficients in run order
        result=abs(coeff/quantizer)
        if result equal to zero then
            increment run length
        else
            write run length
            write result
            write sign of coeff
            initialize run length to zero
        end if
    end.

It can be appreciated that the above pseudo-code utilizes a conditional IF branching statement to determine whether the algorithm should count the values of zero (increment run length) or write out the non-zero coefficient (result) and current zero value count (run length). To minimize processing cycles, modern central processing units (CPU), such as Intel's Pentium™ and Pentium Pro™ microprocessors, attempt to predict which branch of the branching statement the algorithm is going to select based upon previous branch selections. If the CPU mispredicts which branch is selected, the CPU must utilize extra CPU cycles to correct the misprediction. This is referred to as a branch misprediction penalty. As the branch misprediction penalty increases, coding efficiency decreases. Modern run length encoding techniques as the one described above lead to significant branch misprediction penalties for Pentium™ processors, and even higher penalties for Pentium Pro™ processors. It is estimated that the branch misprediction penalty running conventional run length encoding algorithms on Pentium™ processors is 3 cycles per coefficient, and for Pentium Pro™ processors is 10 cycles per coefficient.

In addition, conventional quantization techniques are expensive since they quantize only one value at a time. This requires a large number of calculations which further decreases coding efficiency.

In view of the foregoing, it can be appreciated that a substantial need exists for quantizing and run length encoding algorithms for improving the coding efficiency for transform based video coders.

SUMMARY OF THE INVENTION

This and other needs are met by a method and apparatus for quantizing and run length encoding video data for transform based coders. The video data is separated into blocks of pixels. The pixel values are transformed to another set of values which can be represented with less data. The transformed values are quantized by generating a quantized magnitude and sign for multiple transformed values at a time, while removing branch misprediction errors during the quantizing process. The quantized values are run length encoded while removing branch misprediction errors during the run length encoding process.

DETAILED DESCRIPTION

Figure 1:
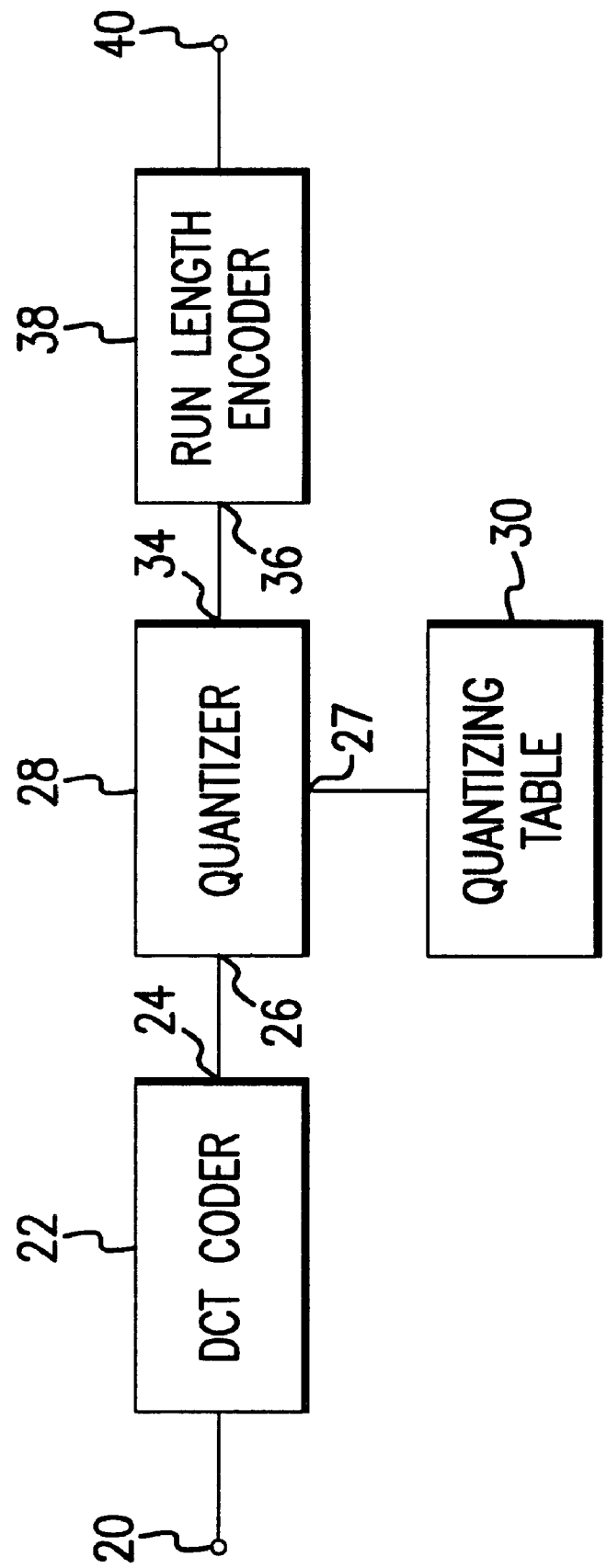
FIG. 1 is a block diagram of a partial compression circuit for use with a transform-based video coder in accordance with an embodiment of the invention.

Referring now in detail to the drawings wherein like parts are designated by like reference numerals throughout, there is illustrated in FIG. 1 a block diagram of a partial compression circuit for use with a transform-based video coder in accordance with an embodiment of the invention.

As shown in FIG. 1, discrete cosine transform (DCT) circuit 22 has a digital image data input 20 and a DCT coefficient output 24. Quantizer 28 has a quantizer input 26 which is coupled to DCT coefficient output 24 for receiving DCT coefficients from DCT circuit 22, and a quantization table input 27 for receiving quantization information from quantization table 30. Quantizer 28 also has a quantizer output 34. A run length encoding circuit 38 has a run length encoding input 36 coupled to quantizer output 34 for receiving quantized DCT coefficients, and a run length encoding output 40.

In operation, DCT circuit 22 receives a block of video data through digital image data input 20. The block is an 8×8 block of pixels (or pixel differences) from a video frame or picture, although any size block falls within the scope of the invention. DCT circuit 22 transforms the values for the 8×8 block of pixels into another set of values which can be transmitted with less data. More particularly, DCT circuit 22 transforms the values for the block to 16-bit DCT coefficients. The DCT coefficients represent the original pixel values (or pixel differences) in the frequency domain. The signal power for the resultant block is concentrated in specific frequency components.

Quantizer 28 receives the DCT coefficients for the block through quantizer input 26. Quantizer 28 quantizes the received DCT coefficients according to quantization table 30 supplied by the application. Run length encoding circuit 38 receives the quantized DCT coefficients through run length encoding input 36. Circuit 38 linearizes the quantized DCT coefficients according to a zig-zag pattern shown in FIG. 2.

Figure 2:
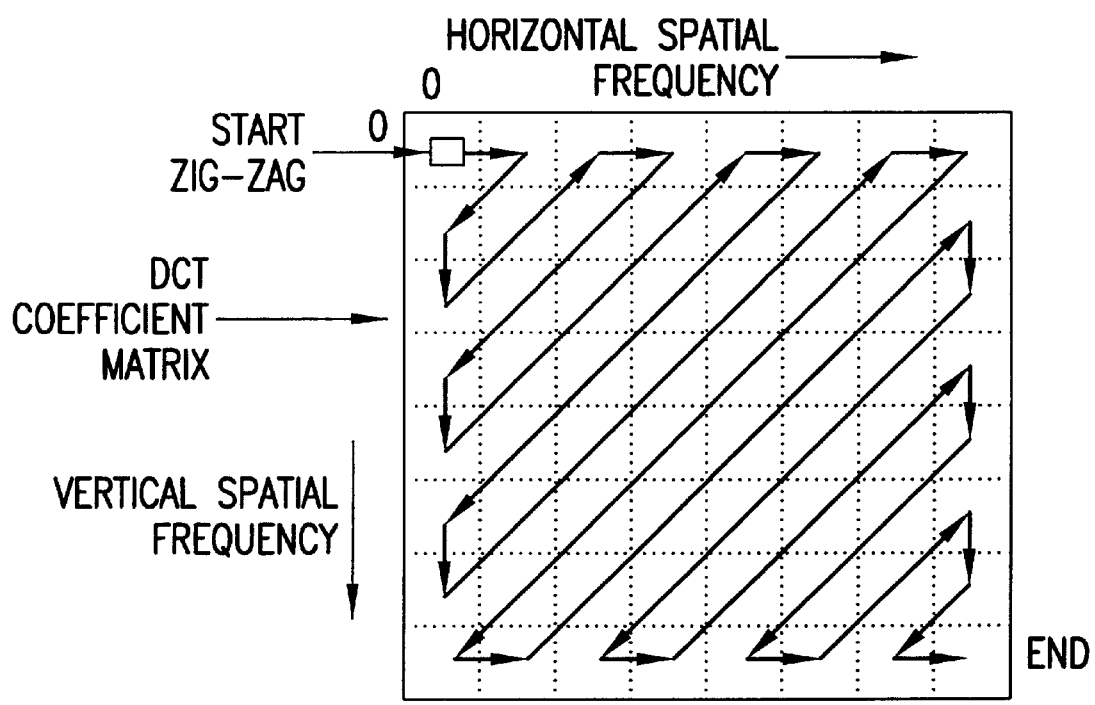
FIG. 2 is a diagram of zig-zag pattern in accordance with an embodiment of the invention.

FIG. 2 is a diagram of zig-zag pattern used in accordance with an embodiment of the invention. As shown in FIG. 2, the quantized DCT coefficients are stored in a DCT coefficient matrix. A zig-zag pattern traverses the DCT coefficient matrix from the lowest frequency DCT coefficient (i.e., the DCT DC coefficient) which is at the upper left corner of the matrix, to the highest frequency DCT coefficient which is at the lower right corner.

In addition to linearizing the quantized DCT coefficients according to the zig-zag pattern shown in FIG. 2, run length encoding circuit 38 run length encodes the quantized DCT coefficients. Circuit 38 run length encodes the quantized DCT coefficients by generating a sequence of triples, where each triple consists of a run value representing the number of consecutive quantized DCT coefficient having a value of zero, a coefficient value representing a quantized DCT coefficient having a non-zero value, and a sign for the non-zero value.

Run length encoding circuit 38 takes advantage of the fact that, for typical video images, after DCT transformation and quantization, there are few non-zero quantized DCT coefficients, and they are usually distributed in the upper left corner of the (8×8) block of FIG. 2 (i.e., they tend to be low frequency). The result is run-length encoding that produces a small number of triples of run values, coefficient values, and signs, with a long run of quantized DCT coefficients (or quantized DCT coefficient differences) having a value of zero at the end of the block. This final string of zeros can be identified by any conventional technique, such as an end of block (EOB) marker.

Figure 3:
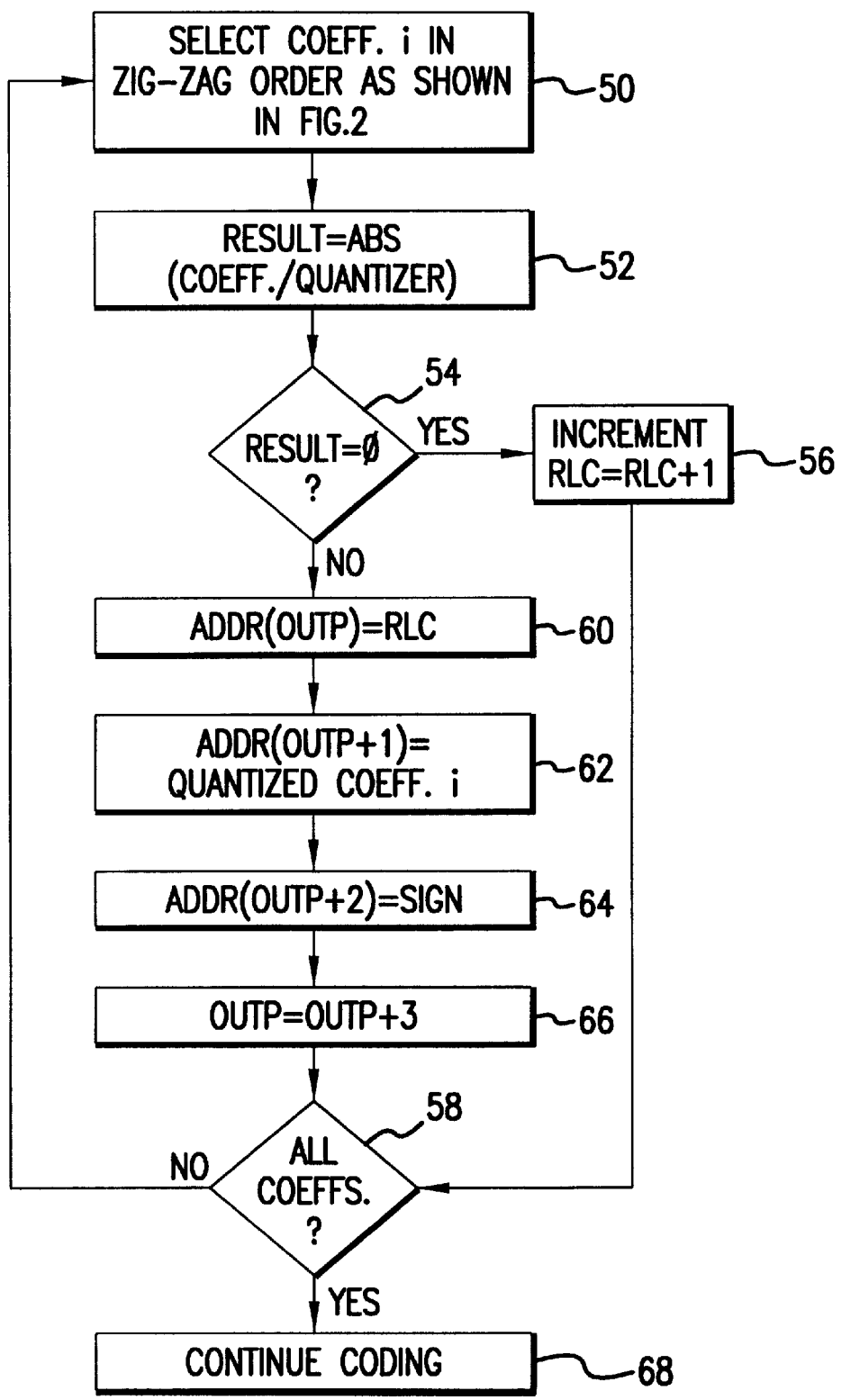
FIG. 3 illustrates a block flow diagram of a conventional quantization and run length encoding scheme.

FIG. 3 illustrates a block flow diagram of a conventional quantization and run length encoding algorithm. A DCT coefficient i is selected at step 50. At step 52, coefficient i is divided by a number (QUANTIZER) to produce RESULT. At step 54, RESULT is tested. If RESULT=0, then a run length counter (RLC) is incremented by 1 at step 56. At step 58, the algorithm checks if all coefficients for a block have been tested. If so, coding continues according to the particular compression algorithm. For example, in a block motion compensated transform based compression algorithm, the run length encoded values are further encoded using entropy encoding. If not, the next coefficient i is selected and run length encoded.

If at step 54 RESULT is not equal to zero, RLC is outputted at step 60, RESULT is outputted at step 62, the sign of RESULT (SIGN) is outputted at step 64, and the output pointer (OUTP) for the run length encoding array storing the outputted values is incremented by three to prepare for outputting the next set of triples. The sign of each coefficient is used during the entropy encoding phase of a video coder, which is not described herein.

For an 8×8 block of pixels, the run length encoding scheme described with reference to FIG. 3 executes 64 branches. This leads to branch misprediction errors which increases the number of CPU cycles required to process the algorithm. Thus, a run length encoding scheme which removes the need for branching decisions would remove the possibility of branch misprediction errors, and would result in a concomitant savings in CPU cycles. An embodiment of the invention illustrating this type of run length encoding scheme is discussed in detail with reference to FIG. 4.

Run Length Encoding

Figure 4:
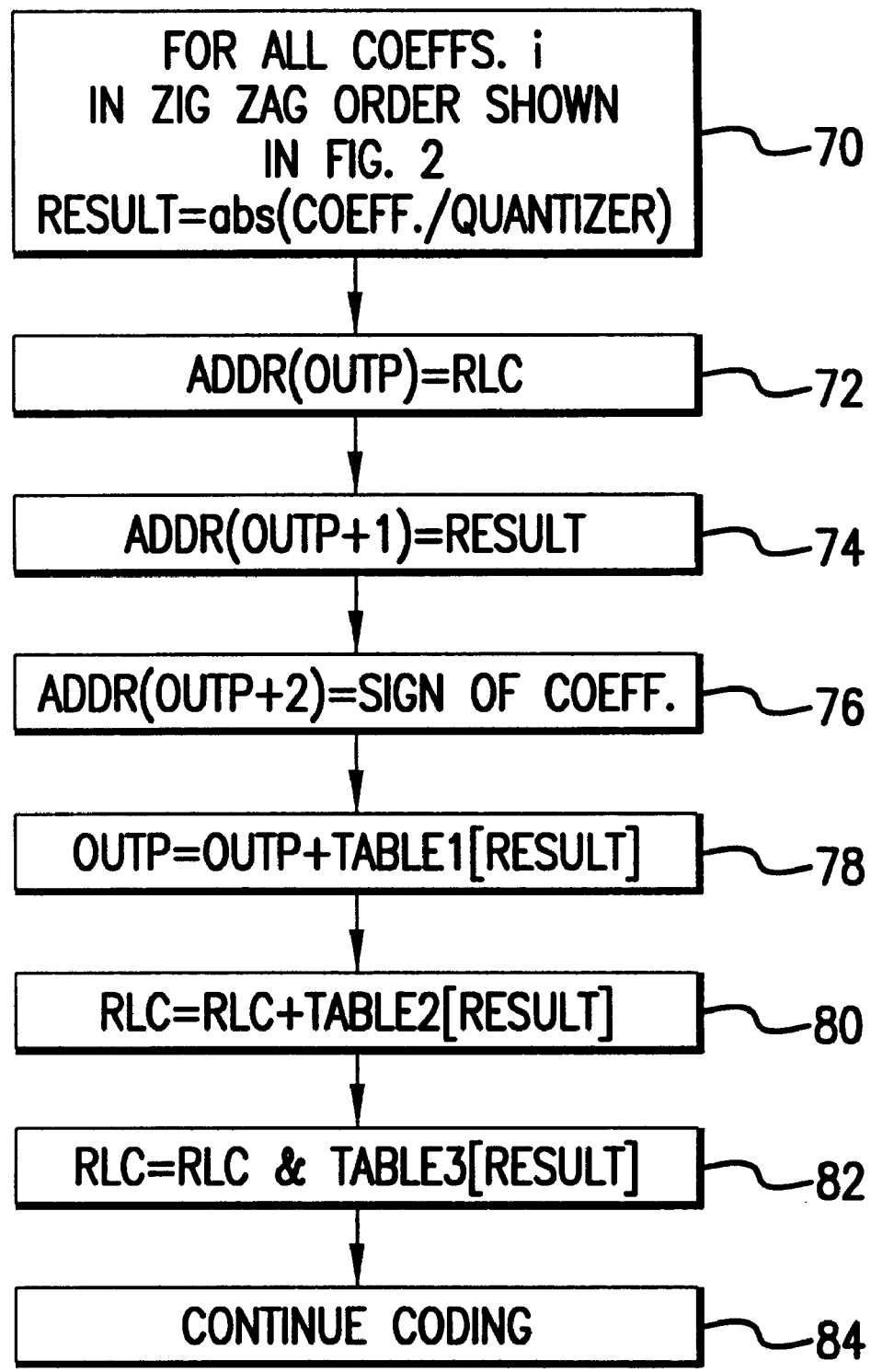
FIG. 4 illustrates a block flow diagram of a run length encoding scheme used in accordance with an embodiment of the invention.

FIG. 4 illustrates a block flow diagram of a run length encoding scheme used in accordance with an embodiment of the invention. As shown in FIG. 4, each quantized coefficient is processed one at a time using steps 70, 72, 74, 76, and 78. For each coefficient i, a sequence of triples are written out to a run length encoding array, wherein each triple consists of a value for RLC, RESULT and SIGN, at steps 72, 74, and 76, respectively.

At step 78, OUTP for the run length encoding array is assigned a value where OUTP=OUTP+Table1 [RESULT]. Table1 is an array of values, wherein the zero address of Table1 contains a value of zero, and the remaining addresses contain a value of three. Thus, if RESULT is zero, OUTP is incremented by the value stored in the zero address of Table1, which is zero. If RESULT is any other number, OUTP is incremented by the value stored in the address corresponding to the other number of Table1, which will always contain the value of three. Consequently, if the quantized coefficient is a zero, OUTP is not incremented, and RLC, RESULT and SIGN are written out to the same addresses in the run length encoding array as before. If the quantized coefficient is a non-zero value, however, OUTP is incremented by three, which moves the OUTP pointer to where the next set of triples is to be written to in the run length coding array.

To ensure that a run of zeros is properly accounted for by RLC without the use of conditional branching statements, RLC uses a scheme similar to that used for incrementing OUTP. At step 80, RLC is assigned a value where RLC= RLC+Table2 [RESULT]. Table2 is an array of values, wherein the zero address of Table2 contains a value of one, and the remaining addresses contain a value of zero. Thus, if RESULT is zero, RLC is incremented by the value stored in the zero address of Table2, which is one. If RESULT is any other number, RLC is incremented by the value stored in the address corresponding to the other number of Table2, which will always contain the value of zero. Consequently, if the quantized coefficient is a zero, RLC is incremented. If the quantized coefficient is a non-zero value, however, RLC is not incremented, and RLC is reinitialized to zero at step 82.

Step 82 also utilizes a table referred to as Table3. As shown in FIG. 4, RLC is incremented using a bit wise AND function and Table3. Table3 is an array of values, wherein the zero address of Table3 contains a value of all ones, and the remaining addresses contain a value of zero. Thus, if RESULT is zero, RLC is bit wise AND'd using the value stored in the zero address of Table3, which is all ones, thus not changing the value of RLC. If RESULT is any other number, RLC is bit wise AND'd using the value stored in the address corresponding to the other number of Table3, which will always contain the value of zero, thereby reinitializing RLC to zero. Coding for all coefficients continues at step 84.

Figure 5:
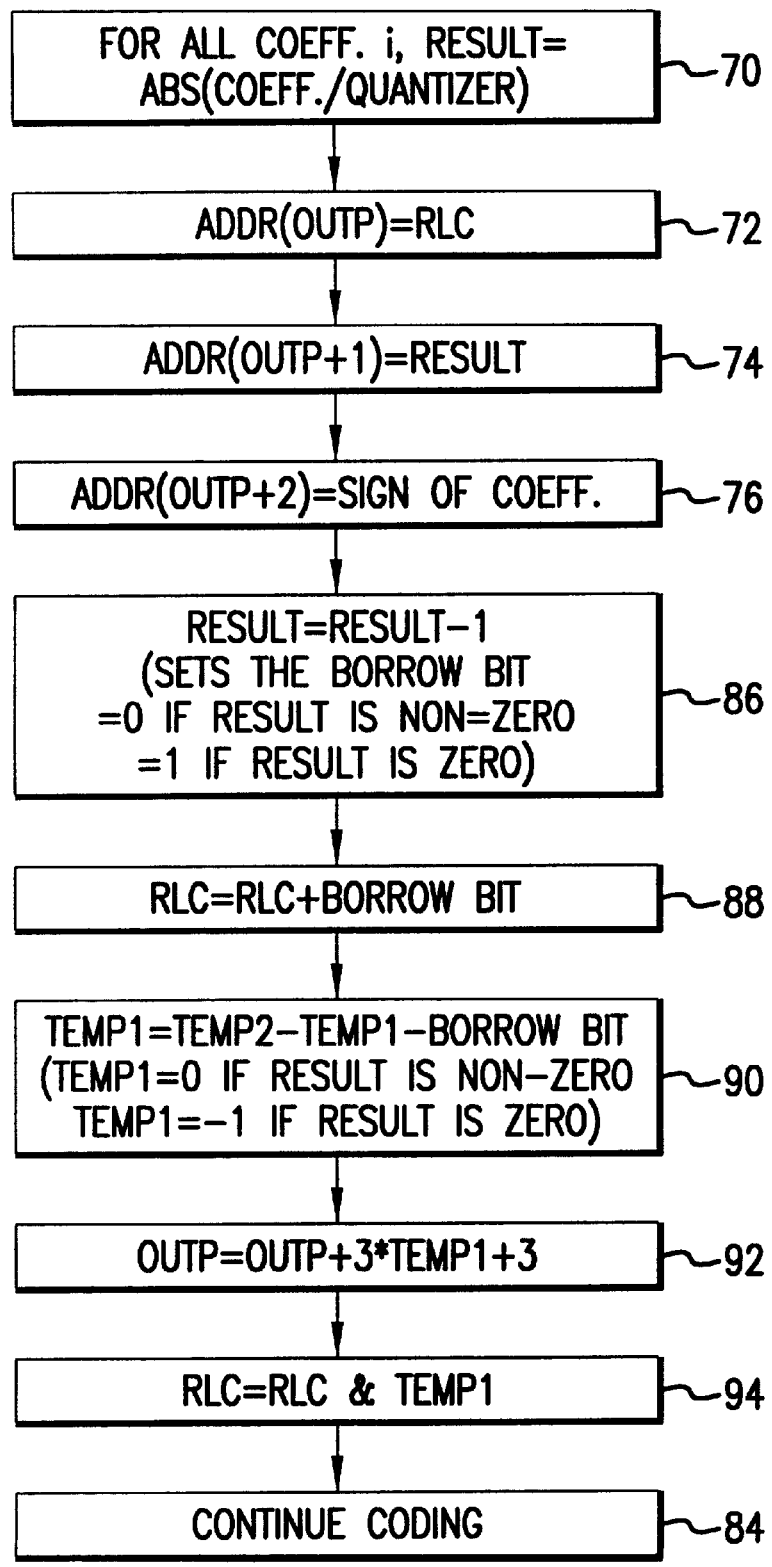
FIG. 5 illustrates a block flow diagram of a run length encoding scheme used in accordance with another embodiment of the invention.

FIG. 5 illustrates a block flow diagram of a run length encoding scheme used in accordance with another embodiment of the invention. This embodiment also run length encodes transform coefficients without using a conditional branching statement, or tables shown in the embodiment discussed with reference to FIG. 4. As with FIG. 4, Steps 70, 72, 74, 76 and 84 of FIG. 5 remain the same. OUTP and RLC, however, are updated without using tables, as shown in steps 86, 88, 90, 92 and 94.

At step 86, RESULT=RESULT−1. If RESULT is equal to zero, the borrow bit for the processor is set to one. If RESULT is a non-zero value, the borrow bit is set to zero.

At step 88, RLC is incremented by the value of the borrow bit. Thus, if RESULT is zero, the borrow bit for the processor is set to one, which means RLC is incremented by one. If RESULT is non-zero, the borrow bit for the processor is set to zero, which means RLC is incremented by zero.

At step 90, RLC is updated using a temporary holding value TEMP1. TEMP1 equals TEMP1 minus TEMP1 minus the borrow bit. Thus, if the borrow bit is zero, which means RESULT is non-zero, TEMP1 equals zero. If the borrow bit is one, which means RESULT is zero, TEMP1 equals negative one.

At step 92, OUTP equals OUTP plus three times TEMP1 plus three. Thus, if RESULT is zero, TEMP1 is negative one, which means OUTP is not incremented. If RESULT is non-zero, TEMP1 is zero, which means OUTP is incremented by three.

At step 94, RLC is reinitialized to zero if RESULT is non-zero. RLC is equal to RLC bit wise AND'd with TEMP1. Thus, if RESULT is zero, TEMP1 is negative one, which means RLC remains unchanged. If RESULT is non-zero, TEMP1 is zero, which means RLC is assigned the value of zero.

Quantizing

Conventional quantizing algorithms suffer from two problems. First, these algorithms quantize only one coefficient at a time. Second, these algorithms quantize a coefficient and a sign value for the coefficient in two separate steps, thus requiring the use of a conditional branching statement.

By way of contrast, an embodiment of the invention uses a quantizing algorithm which quantizes a plurality of coefficients at a time. This embodiment quantizes a set of coefficients at a time, with each set of coefficients containing between 2 to 8 coefficients, with an advantageous set containing 4 coefficients. This results in the processor running the quantization algorithm having to use fewer processing cycles. This is accomplished using an instruction provided by the MMX™ instruction set.

In addition, this embodiment quantizes the sign for each coefficient within a set of coefficients at the same time each coefficient is quantized. This removes the need for using conditional branching statements, which removes the possibility of branch misprediction penalties.

Figure 6:
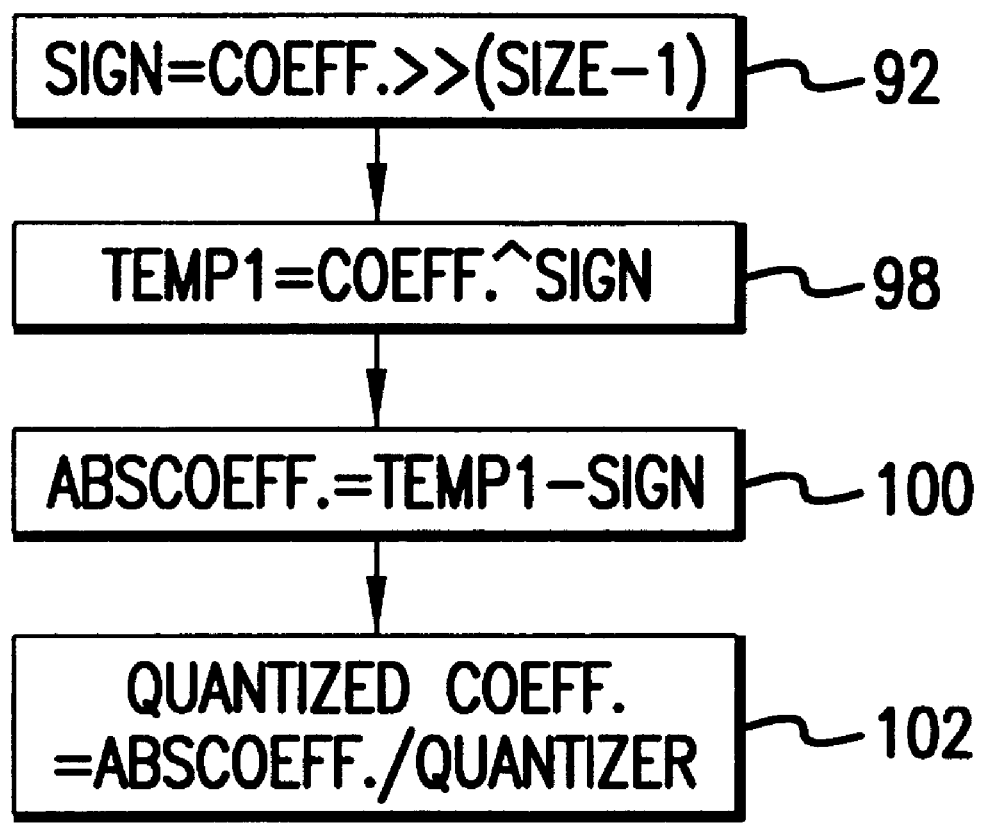
FIG. 6 illustrates a block flow diagram of a quantizing scheme used in accordance with an embodiment of the invention.

FIG. 6 illustrates a block flow diagram of a quantizing scheme used in accordance with an embodiment of the invention. As shown in step 96, SIGN is equal to the DCT coefficient shifted right by the number of bits in the coefficient minus one. SIGN is then exclusive-OR'd with the coefficient, and the resulting value is assigned to TEMP1 at step 98. Thus, if SIGN is negative, TEMP1 is assigned the one's complement of the coefficient. IF SIGN is positive, TEMP1 is simply assigned the value of the coefficient. At step 100, the value ABSCOEFF is derived by subtracting SIGN from TEMP1. Again, if SIGN is positive, ABSCOEFF is simply assigned the coefficient. If SIGN is negative, however, ABSCOEFF is assigned the one's complement of the coefficient plus one (i.e., ABSCOEFF equals two's complement of the coefficient). At step 102, the quantized coefficient is generated by dividing ABSCOEFF by a quantizing value (QUANTIZER).

Accordingly, the quantizing algorithm described with reference to FIG. 6 generates a quantized coefficient and a sign value for each quantized coefficient without using any conditional branching statements, thereby removing the possibility of any branch misprediction errors. Moreover, this embodiment of the invention quantizes multiple coefficients at a time, thus reducing the overall number of calculations required for a block, thereby freeing processing cycles for other coding tasks.

CONCLUSION

A video coder using the run length encoding algorithm described with reference to FIGS. 4 and 5, and the quantizing algorithm described with reference to FIG. 6, would result in significant savings over the prior art in terms of the number of CPU cycles required to implement each device. It is estimated that a video coder using a Pentium™ processor can save approximately 3 processing cycles per coefficient, and a video coder using a Pentium Pro™ processor can save approximately 10–30 processing cycles per coefficient. These extra cycles could be used to process a higher number of frames, thereby increasing the viewing quality of a compressed video signal.

Although this embodiment of the invention is illustrated as a series of steps using pseudo-code, it can be appreciated that person of ordinary skill in the art could implement this embodiment in either software or hardware. This embodiment of the invention assumes a software based video coder implemented on a personal computer, which at a minimum has a CPU, memory, input device, and output device. It is further assumed for illustrative purposes that the CPU is a Pentium™, Pentium Pro™ or MMX™ microprocessor, using standard operating software for use with these microprocessors.

Although embodiments are specifically illustrated and described herein, it will be appreciated that modifications and variations of the present invention are covered by the above teachings and within the purview of the appended claims without departing from the spirit and intended scope of the invention. For example, although an embodiment of the invention was illustrated using a transform coder using DCT, it can be appreciated that any transform coding technique falls within the scope of the invention. For another example, although various embodiments of the invention were illustrated using steps based in software, it can be appreciated that these embodiments can be implemented in hardware as well.

What is claimed is:

1. A method for comprising image data, comprising:
receiving a first set of values representing an image;
transforming said first set of values into a second set of values;
quantizing said second set of values; and
run length encoding said quantized values using at least one encoding table by:
  receiving a first value from said quantized values;
  determining whether said first value is a zero or non-zero value; and
  incrementing an array pointer by zero if said first value is a zero value and by three if said first value is a non-zero value using a first table.

2. The method of claim 1, wherein said second set of values are discrete cosine transform coefficients.

3. The method of claim 1, wherein said run length encoding further comprises:
  incrementing a counter value by one if said first value is a zero value and by zero if said first value is a non-zero value using a second table;
  initializing said counter if said first value is a non-zero value using a third table; and
  storing said counter value, said first value and a sign for said first value as said run length encoded values in an array using said array pointer.

4. The method of claim 3, wherein said first table is an array from zero to N, and wherein a zero address contains a value of zero and remaining addresses contain a value of three.

5. The method of claim 3, wherein said second table is an array from zero to N, and wherein a zero address contains a value of one and remaining addresses contain a value of zero.

6. The method of claim 3, wherein said third table is an array from zero to N, and wherein a zero address contains a value of one and remaining addresses contain a value of zero.

7. The method of claim 1, wherein said plurality of values comprises four discrete cosine transform coefficients.

8. The method of claim 1, wherein said quantizing comprises:
  receiving a first value from said second set of values, said first value having a predetermined number of bits;
  shifting right said first value said predetermined number of bits minus one to form a first variable;
  performing an exclusive OR operation with said first value and said first variable to form a second variable;
  subtracting said first variable from said second variable to form a third variable; and
  dividing said third variable by a quantizing value.

9. A machine-readable medium whose contents cause a computer system to compress image data by performing the steps of:
  receiving a first set of values representing an image;
  transforming said first set of values into a second set of values;
  quantizing said second set of values; and
  run length encoding said quantized values using at least one encoding table by:
    receiving a first value from said quantized values;
    determining whether said first value is a zero or non-zero value;
    incrementing an array pointer by zero if said first value is a zero value and by three if said first value is a non-zero value using a first table.

10. The machine-readable medium of claim 9, wherein said second set of values are discrete cosine transform coefficients.

11. The machine-readable medium of claim 9, wherein said run length encoding further comprises:
  incrementing a counter value by one if said first value is a zero value and by zero if said first value is a non-zero value using a second table;
  initializing said counter if said first value is a non-zero value using a third table; and
  storing said counter value, said first value and a sign for said first value as said run length encoded values in an array using said array pointer.

12. The machine-readable medium of claim 11, wherein said first table is an array from zero to N, and wherein a zero address contains a value of zero and remaining addresses contain a value of three.

13. The machine-readable medium of claim 11, wherein said second table is an array from zero to N, and wherein a zero address contains a value of one and remaining addresses contain a value of zero.

14. The machine-readable medium of claim 11, wherein said third table is an array from zero to N, and wherein a zero address contains a value of one and remaining address contain a value of zero.

15. The machine-readable medium of claim 11, wherein said plurality of values comprises four discrete cosine transform coefficients.

16. The machine-readable medium of claim 9, wherein said quantizing comprises:
  receiving a first value from said second set of values, said first value having a predetermined number of bits;
  shifting right said first value said predetermined number of bits minus one to form a first variable;
  performing an exclusive OR operation with said first value and said first variable to form a second variable;
  subtracting said first variable from said second variable to form a third variable; and
  dividing said third variable by a quantizing value.

17. An apparatus to compress image data, comprising:
  a discrete cosine transform coder to generate discrete cosine transform coefficients;
  a quantizer operably coupled to said discrete cosine transform coder to generate quantized coefficients from said discrete cosine transform coefficients; and
  a run length encoder for run length encoding said quantized coefficients using at least one encoding table to increment an array pointer according to said at least one encoding table by:
    receiving a first value from said quantized coefficients;
    determining whether said first value is a zero or non-zero value; and
    incrementing an array pointer by zero if said first value is a zero value and by three if said first value is a non-zero value using a first table.

18. The apparatus of claim 17, wherein said run length encoder utilizes a first encoding table to update said array pointer for a storage array.

19. The apparatus of claim 18, wherein said run length encoder utilizes a second encoding table to update a run length counter.

20. The apparatus of claim 19, wherein said run length encoder utilizes a third encoding table to initialize said run length counter.

21. The apparatus of claim 17, wherein said discrete cosine transform coefficient is stored in a register and comprises a predetermined number of bits, and wherein said quantizer comprises:

a right-shifter to shift right a discrete cosine transform coefficient said predetermined number of bits minus one to form a first value;

an exclusive OR circuit to exclusive OR said discrete cosine transform coefficient and said first value to form a second value;

a subtractor to subtract said first value from said second value to form a third value; and a divider to divide said third value by a quantizing value.

* * * * *